US005621968A

United States Patent [19]

Kikkawa et al.

[11] Patent Number: 5,621,968

[45] Date of Patent: Apr. 22, 1997

[54] PROCESS FOR MANUFACTURING A GAS TURBINE BLADE

[75] Inventors: Shouichi Kikkawa; Kouji Takahashi; Sunao Aoki, all of Takasago, Japan

[73] Assignee: Mitsubishi Jukogyo Kabushiki Kaisha, Tokyo, Japan

[21] Appl. No.: 390,476

[22] Filed: Feb. 17, 1995

[30] Foreign Application Priority Data

Feb. 18, 1994 [JP] Japan .................................... 6-045222

[51] Int. Cl.$^6$ .................................................. B23D 15/00

[52] U.S. Cl. .................................... 29/889.7; 29/889.721

[58] Field of Search ............................... 29/889.7, 889.1, 29/889.721, 557, 527.2, 527.4

[56] References Cited

U.S. PATENT DOCUMENTS

| | | | |
|---|---|---|---|
| 5,030,060 | 7/1991 | Liang | 415/115 |
| 5,039,562 | 8/1991 | Liang | 427/276 |
| 5,113,582 | 5/1992 | Monson et al. | 29/889.1 |
| 5,142,778 | 9/1992 | Smolinski et al. | 29/889.1 |
| 5,185,924 | 2/1993 | Fraser | 29/889.1 |
| 5,210,944 | 5/1993 | Monson et al. | 29/889.1 |
| 5,216,808 | 6/1993 | Martus et al. | 29/889.1 |
| 5,419,039 | 5/1995 | Auxier et al. | 29/889.721 |

FOREIGN PATENT DOCUMENTS

| | | |
|---|---|---|
| 0253754 | 1/1988 | European Pat. Off. . |
| 2816283 | 10/1978 | Germany . |

OTHER PUBLICATIONS

Patent Abstracts of Japan, vol. 9, No. 145 (C–287) Jun. 20, 1985.

Patent Abstracts of Japan, vol. 17, No. 251, (C–1060) May 19, 1993.

*Primary Examiner*—Irene Cuda
*Attorney, Agent, or Firm*—Wenderoth, Lind & Ponack

[57] ABSTRACT

The main body of an alloy for a gas-turbine blade has an outer surface which has concave portions (10) except around through holes (4) allowing a cooling fluid to pass. The concave portions (10) hold a heat-shielding coating made of an inner bonding layer and an outer ceramic layer.

8 Claims, 3 Drawing Sheets

PROCESS FOR MANUFACTURING A GAS -TURBINE BLADE

BACKGROUND OF THE INVENTION

1. Field of the Invention

This invention relates to a gas-turbine blade, and more particularly to a gas turbine blade having a heat-shielding coating layer formed on its surface, and a process for manufacturing the gas turbine blade.

2. Description of the Prior Art

The blades of a high temperature gas turbine are cooled to or below the temperature which the blade material can withstand. A cooling method, such as impingement or film cooling, is usually employed to cool the blades by utilizing compressed air. The blade main body is made of an alloy and often has surfaces coated with a ceramic material, since the ceramic material is superior to the metallic material in heat resistance, though inferior in thermal shock resistance and mechanical strength. The ceramic material is used as a heat-shielding coating to lower the blade temperature.

FIG. 5 shows a gas-turbine blade of known construction. The blade comprises a main body 1 made of an alloy and having a hollow interior 2 and a wall 3 having a plurality of through holes 4. Substantially the whole outer surface of the blade body 1, excluding the holes 4, is covered with a heat-shielding coating layer 5 formed from a ceramic material. Compressed air is blown into the hollow interior 2 and out through the holes 4 to cool the blade.

The holes 4 are usually made by electric discharge machining, and have to be made before the coating layer 5 is formed, since the coating is a dielectric which does not permit electric discharge machining. The holes 4 have, therefore, to be masked when the coating layer 5 is formed. The removal of the masking material to open the holes 4 thereafter, however, results in an uneven blade surface which will cause an increased aerodynamic loss.

SUMMARY OF THE INVENTION

Under these circumstances, it is an object of this invention to provide a gas-turbine blade having an even surface that does not increase aerodynamic loss and is formed by a closely adhering heat-shielding coating layer which can be formed even before a plurality of holes are made in the blade wall by electric discharge machining, and a method for manufacturing the same.

This object is essentially attained by a blade having a main body formed of an alloy and having a plurality of through holes allowing a cooling fluid to pass therethrough, the main body having an outer surface which has concave portions around the holes and a heat-shielding coating in its concave portions.

The blade of this invention has an even or smooth outer surface that does not cause any undesirable aerodynamic loss, since its heat-shielding coating is formed on the concave portions of its outer surface so as not to protrude from the main body in which the through holes are made. A desired surface finish is easy to obtain if the entire surface of the blade, including its heat-shielding coating, is appropriately polished as required. The blade is, therefore, reliable in performance, and can be used to make a gas turbine having an improved reliability in performance.

The heat-shielding coating preferably consists of a ceramic surface layer and an underlying bonding layer which adheres closely to the ceramic surface layer and the outer surface of the alloy main body of the blade to thereby ensure that the heat-shielding coating adheres closely to the blade wall. The coating is variable in thickness if the depth of the concavity on the outer surface of the blade main body is appropriately altered.

The ceramic layer preferably has a thickness of 0.3 to 0.5 mm, since it is likely that a smaller thickness may result in a layer having a lower heat-shielding effect, while a larger thickness results in a lower thermal shock resistance. The bonding layer preferably has a thickness of 0.1 to 0.2 mm which is sufficient for its anchoring purposes, while a larger thickness calls for a concavity which may be too deep for the blade and results in reducing the thickness of the blade.

Other features and advantages of the invention will become apparent from the following description and the accompanying drawings.

DESCRIPTION OF THE PREFERRED EMBODIMENT

A gas-turbine blade embodying this invention is shown in FIGS. 1 to 4. Like numerals are used to denote like parts in FIGS. 1 to 4 and FIG. 5, so that it may not be necessary to repeat the description of any of the features which have already been described with reference to FIG. 5.

The blade comprises a main body 1 formed of an alloy, such as a Ni-based or Co-based alloy, or an inter-metallic compound such as a Ti—Al alloy. The main body 1 has a wall 3 defining a hollow interior 2 and having a plurality of through holes 4.

Figure 1:
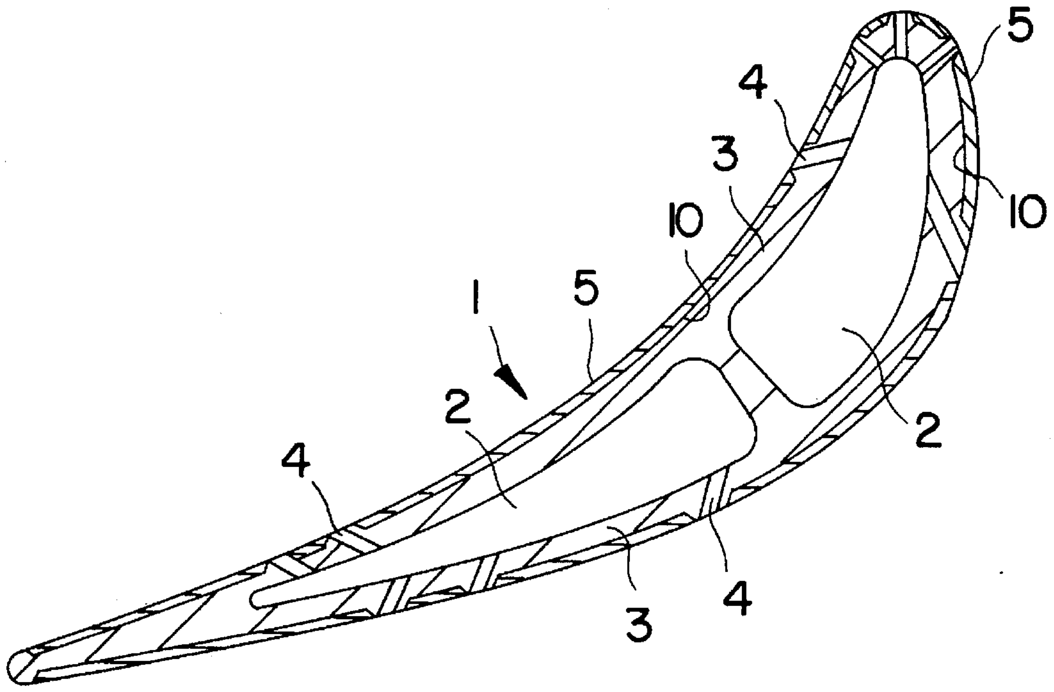
FIG. 1 is a cross sectional view of a gas-turbine blade embodying this invention.
Figure 2:
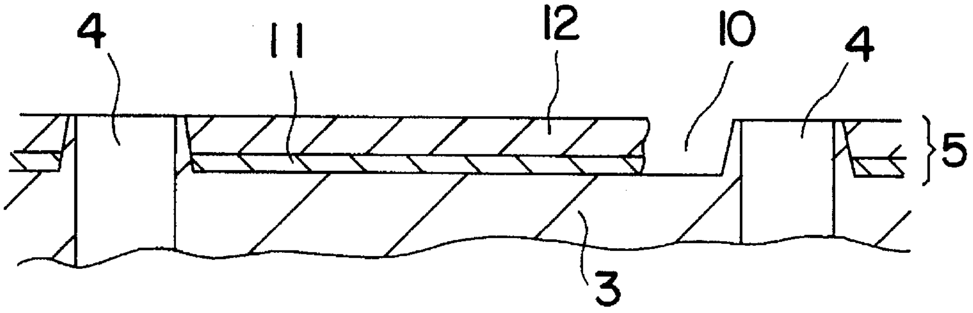
FIG. 2 is an enlarged view of a part of the blade shown in FIG. 1, showing its heat-shielding coating in detail.

The main body 1 has concave or recessed portions 10 on an outer surface except around the holes 4, and holds a heat-shielding coating 5 thereon. The heat-shielding coating 5 consists of two layers, i.e. an inner or bonding layer 11 formed on the outer surface of the main body 1 and an outer or ceramic layer 12 formed on the bonding layer 11, as shown in FIG. 2.

The bonding layer 11 is formed from a material as represented by the formula MCrAlY, where M stand for Ni or Co, or a combination thereof. This material undergoes diffusion with the alloy forming the main body 1 upon heat treatment and thereby enables the bonding layer 11 to adhere closely to the main body 1. The bonding layer 11 has a thickness of 0.1 to 0.2 mm. The bonding layer 11 has a surface which is sufficiently rough for anchoring the ceramic layer 12 thereon.

The ceramic layer 12 is a heat-shielding layer formed from a ceramic material, such as alumina ($Al_2O_3$)or stabilized zirconia (e.g. $ZrO_2.Y_2O_3$, $ZrO_2.MgO$ or $ZrO_2.CO$). It has a thickness of 0.3 to 0.5 mm and adheres closely to the bonding layer 11.

Figure 3:
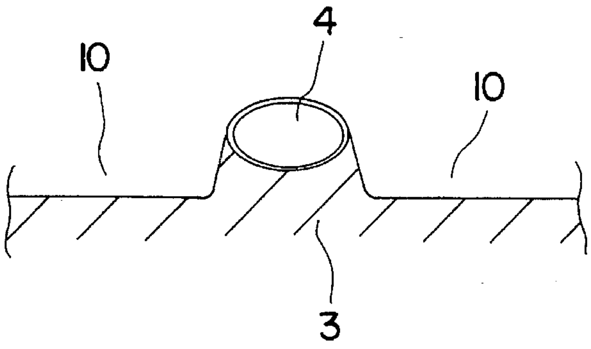
FIG. 3 is a schematic perspective view of a hole formed in the wall of the blade shown in FIG. 1, and a concave wall surface for holding its heat-shielding coating therein.
Figure 4:
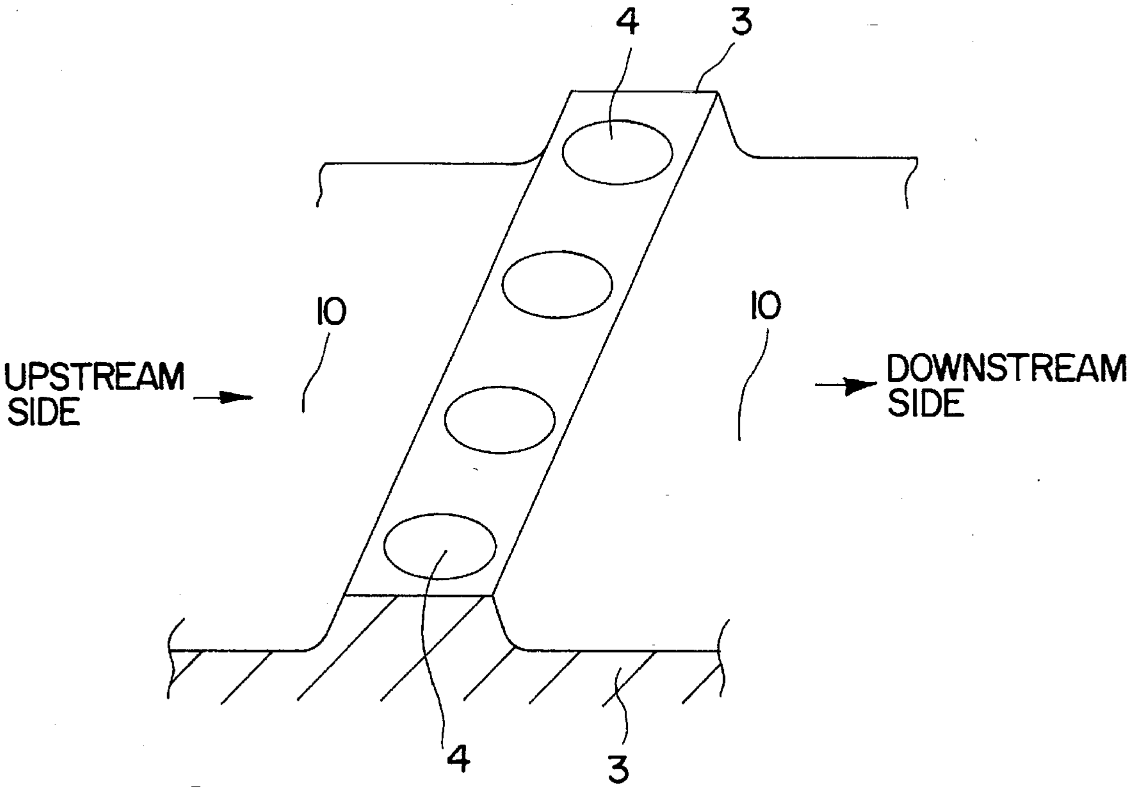
FIG. 4 is a schematic perspective view of a row of holes formed in the wall of the blade shown in FIG. 1, and a concave wall surface for holding its heat-shielding coating therein.
Figure 5:
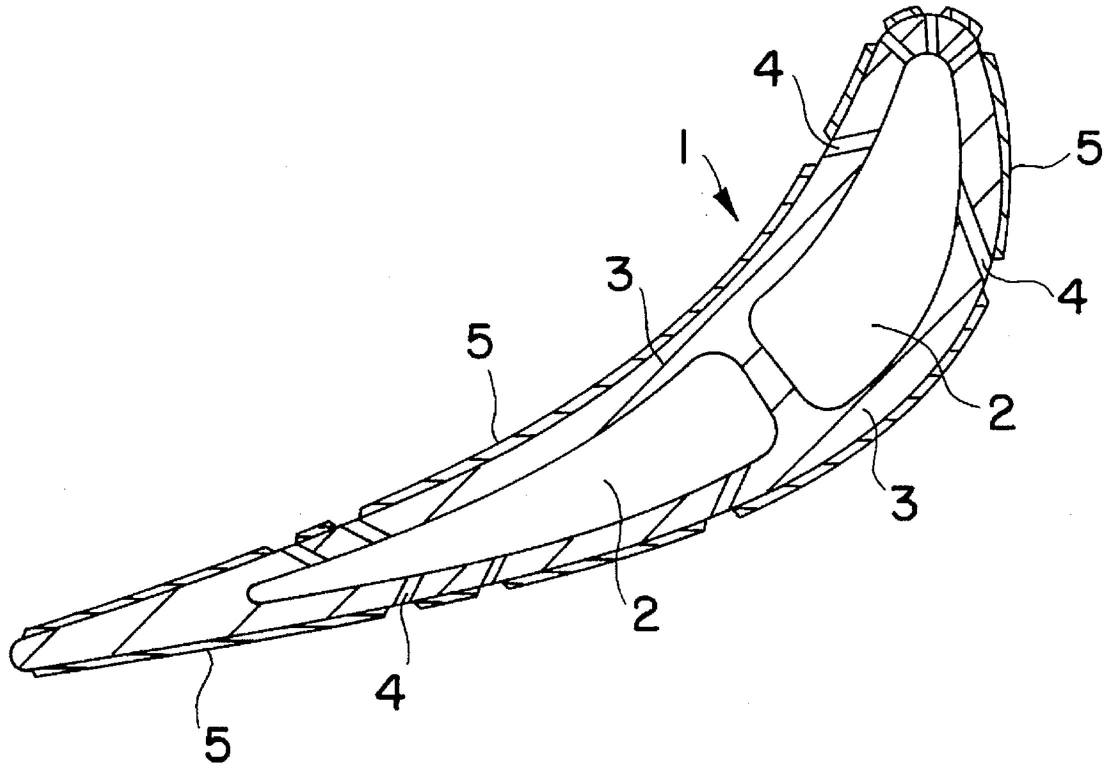
FIG. 5 PRIOR ART
FIG. 5 is a cross sectional view of a known gas-turbine blade.

The holes 4 may be formed separately from one another so that each hole 4 may be surrounded by the concave portion 10 of the blade wall 3, as shown in FIG. 3, or in a row crossing to the direction of air flow as shown by arrows in FIG. 4. Each hole 4, or each set of holes 4 forming a row are formed in a projection or raised portion of the wall 3 of the blade. The holes 4 may be circular as shown, or may be of a different shape, such as square or oval.

After the heat-shielding coating 5 has been formed, its outer surface is polished until each projection of the wall 3 surrounding a hole 4 is exposed, and an intended blade contour is obtained.

The holes 4 can be made even after the heat-shielding coating 5 has been formed, since the alloy surfaces exposed by its polishing permit electric discharge machining. Thus, the blade of this invention can be manufactured by a process having a broader scope of variation.

What is claimed is:

1. A method of manufacturing a gas turbine blade having a plurality of through holes therein so as to allow a cooling fluid to pass there through, comprising the steps of:

forming a main body of an alloy so that the main body has an outer surface comprising raised portions having through holes therein and recessed portions;

forming a heat-shielding coating in the recessed portions; and polishing the surface of the heat-shielding coating to a desired blade contour.

2. The method of claim 1, wherein said step of forming further comprises:

forming the main body with a hollow interior and with the plurality of through holes extending through the raised portions and communicating with the hollow interior.

3. The method of claim 1, wherein said step of forming further comprises forming the main body with a hollow interior and said method further comprises a step of forming the plurality of through holes so as to extend through the raised portions to the hollow interior.

4. The method of claim 1, wherein said step of forming a heat-shielding coating comprises forming a bonding layer in the recessed portion and forming a ceramic layer on the boding layer.

5. The method of claim 4, wherein the through holes are formed in the raised portions before said step of forming, and said step of polishing exposes the raised portions around the through holes.

6. The method of claim 4, wherein the through holes are formed in the raised portions after said step of polishing.

7. A method of manufacturing a gas turbine blade comprising the steps of:

forming a main body of an alloy so as to have a wall with an outer surface having a plurality of through holes therein, recessed portions around the holes and a hollow interior inside the wall from which a cooling fluid can pass through the through holes to the outside of the wall;

forming a bonding layer in the recessed portions;

forming a ceramic layer on the bonding layer; and polishing the surface of the ceramic layer so as to expose the main body around the through holes and so that the ceramic layer has a desired blade surface contour.

8. A method of manufacturing a gas blade turbine, comprising the steps of:

forming a main body of an alloy so that the main body has an outer surface comprising raised portions and recessed portions;

forming a heat-shielding coating on the main body;

polishing the surface of the heat-shielding coating until the raised portions are exposed; and making a hole through each of the exposed raised portions.

* * * * *